US011368319B2

(12) United States Patent
Kim et al.

(10) Patent No.: US 11,368,319 B2
(45) Date of Patent: Jun. 21, 2022

(54) INTEGRATED CIRCUIT PERFORMING AUTHENTICATION USING CHALLENGE-RESPONSE PROTOCOL AND METHOD OF USING THE INTEGRATED CIRCUIT

(71) Applicant: SAMSUNG ELECTRONICS CO., LTD., Suwon-si (KR)

(72) Inventors: Yongsoo Kim, Osan-si (KR); Juyeon Lee, Suwon-si (KR); Mijung Noh, Yongin-si (KR); Yongki Lee, Suwon-si (KR); Yunhyeok Choi, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 106 days.

(21) Appl. No.: 17/015,554

(22) Filed: Sep. 9, 2020

(65) Prior Publication Data

US 2021/0234709 A1    Jul. 29, 2021

(30) Foreign Application Priority Data

Jan. 23, 2020 (KR) .................. 10-2020-0009398

(51) Int. Cl.
*H04L 9/32* (2006.01)
*H04L 9/08* (2006.01)
(Continued)

(52) U.S. Cl.
CPC ............ *H04L 9/3278* (2013.01); *G06F 21/44* (2013.01); *G06F 21/73* (2013.01); *H04L 9/0866* (2013.01); *H04L 2209/12* (2013.01)

(58) Field of Classification Search
CPC . H04L 9/3278; H04L 9/0866; H04L 2209/12; G06F 21/44; G06F 21/73; G06F 2221/2103
See application file for complete search history.

(56) References Cited

U.S. PATENT DOCUMENTS 8,683,210 B2    3/2014   Devadas
8,694,778 B2    4/2014   Teuwen et al.
(Continued)

FOREIGN PATENT DOCUMENTS

KR      10-2015-0135032    12/2015
KR      10-1943183          1/2019
KR      10-1980964          5/2019

*Primary Examiner* — Jung W Kim
*Assistant Examiner* — Sangseok Park
(74) *Attorney, Agent, or Firm* — F. Chau & Associates, LLC

(57) ABSTRACT

The present disclosure relates to an integrated circuit and a method of using the integrated circuit used to perform authentication using a challenge-response method. The challenge-response method includes an internal challenge generator, a physically unclonable function (PUF) block, and a response generator. The internal challenge generator is configured to receive a challenge, generate a plurality of internal challenges corresponding to the challenge, and generate at least one valid internal challenge among the plurality of internal challenges using screen information. The physically unclonable function (PUF) block is configured to generate a plurality of valid internal responses respectively changing according to the plurality of valid internal challenges. The response generator is configured to output a response generated using the plurality of valid internal responses.

20 Claims, 21 Drawing Sheets

(51) Int. Cl.
 *G06F 21/44* (2013.01)
 *G06F 21/73* (2013.01)

(56) References Cited

U.S. PATENT DOCUMENTS

| | | | |
|---|---|---|---|
| 8,782,396 | B2 | 7/2014 | Ziola et al. |
| 10,275,627 | B2 | 4/2019 | Endress et al. |
| 10,432,410 | B2 | 10/2019 | Cambou |
| 10,476,681 | B2 | 11/2019 | Kim et al. |
| 2009/0217045 | A1 | 8/2009 | Skoric et al. |
| 2010/0127822 | A1* | 5/2010 | Devadas ............... H04L 9/3278 726/2 |
| 2020/0145235 | A1 | 5/2020 | Choi et al. |

* cited by examiner

INTEGRATED CIRCUIT PERFORMING AUTHENTICATION USING CHALLENGE-RESPONSE PROTOCOL AND METHOD OF USING THE INTEGRATED CIRCUIT

CROSS-REFERENCE TO RELATED APPLICATION

This application claims the benefit of Korean Patent Application No. 10-2020-0009398, filed on Jan. 23, 2020 in the Korean Intellectual Property Office, the disclosure of which is incorporated by reference herein in its entirety.

BACKGROUND

The inventive concept relates to an integrated circuit that performs authentication using a challenge-response method, and more particularly, to an integrated circuit for performing authentication using a physically unclonable function of a challenge-response method and a method of using the integrated circuit.

An integrated circuit is a collection of connected electric circuits on a semiconductor substrate. Integrated circuits are located in electronic devices such as mobile phones, computers and televisions and are used to perform processing tasks. In some cases, a company other than the manufacturer can recreate an integrated circuit to mimic performance characteristics of an authentic part.

However, counterfeit and cloned integrated circuits are a significant security threat. For example, counterfeit and cloned integrated circuits cause security concerns if installed in devices that were intended for a different circuit.

Therefore, an integrated circuit may be authenticated after manufacturing, but prior to installation into an electronic device. Integrated circuit authentication ensures the circuit is an authentic part and will perform as designed. However, the authentication process may be resource intensive, causing slower results or greater power consumption. Therefore, there is a need in the art to reduce the computational power used in authentication of an integrated circuit.

SUMMARY

The inventive concept provides an integrated circuit performing authentication using a challenge-response method, and more particularly, an integrated circuit providing a structure using physical copy prevention function for a challenge-response authentication and a method of using the integrated circuit.

According to an aspect of the inventive concept, there is provided an integrated circuit configured to perform authentication using a challenge-response method including: an internal challenge generator configured to, in an authentication mode, receive a challenge, generate a plurality of internal challenges corresponding to the challenge, and generate at least one valid internal challenge among the plurality of internal challenges using screen information; a physically unclonable function (PUF) block configured to generate a plurality of valid internal responses respectively changing according to the plurality of valid internal challenges; and a response generator configured to output a response generated using the plurality of valid internal responses.

According to another aspect of the inventive concept, there is provided an integrated circuit configured to perform authentication using a challenge-response method including: an internal challenge generator configured to, in a registration mode, receive a plurality of challenges, and sequentially generate a plurality of initial internal challenges corresponding to each of the plurality of challenges; a physically unclonable function (PUF) block configured to generate a plurality of initial internal responses respectively changing according to the plurality of initial internal challenges; and a response generator configured to select at least one valid initial internal response that is usable among the plurality of initial internal responses, and generate screen information based on the selected at least one valid initial internal response.

According to another aspect of the inventive concept, there is provided a method of using an integrated circuit configured to perform authentication using a challenge-response method including: in an authentication mode, receiving a challenge; generating a plurality of internal challenges corresponding to the challenge; generating at least one valid internal challenge among the plurality of internal challenges using screen information; generating a plurality of valid internal responses changing according to each of the plurality of valid internal challenges using a physically unclonable function (PUF) block; and outputting a response generated using the plurality of valid internal responses.

According to another aspect of the inventive concept, a method of authenticating an integrated circuit includes receiving an authentication challenge while in an authentication mode of a challenge-response procedure that includes a registration mode and the authentication mode; identifying screen information, wherein the screen information is generated based on a plurality of internal responses created using a PUF block while in the registration mode; selecting at least one valid internal challenge from among a plurality of initial internal challenges based on the screen information according to the authentication mode; and generating an authentication response to the authentication challenge based on the at least one valid internal challenge using the PUF block.

BRIEF DESCRIPTION OF THE DRAWINGS

Embodiments of the inventive concept will be more clearly understood from the following detailed description taken in conjunction with the accompanying drawings in which.

DETAILED DESCRIPTION

Figure 1:
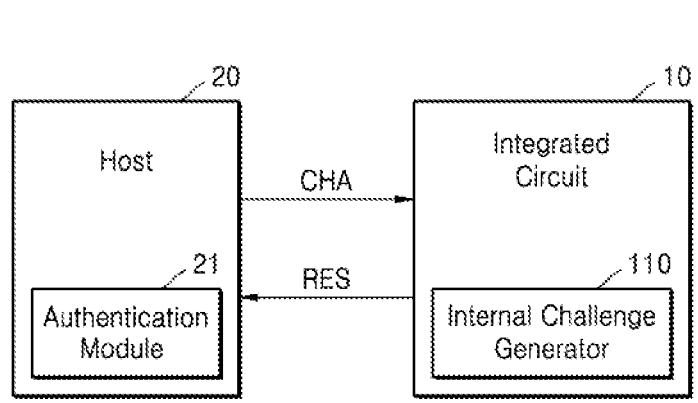
FIG. 1 is a diagram illustrating a network system according to an embodiment.

The present disclosure relates generally to integrated circuit that performs authentication using a challenge-response method, and more particularly, to an integrated circuit capable of performing authentication using a physically unclonable function. Embodiments of the present disclosure use a registration mode and an authentication mode to authenticate the integrated circuit without using excess physically unclonable function (PUF) cells. In the registration mode, responses for each of a plurality of challenges. Then, valid responses are selected and the validity information (i.e., screen information) may be stored. In the authentication mode, the screen information may be used to screen the internal challenges before the responses are generated, therefore avoiding excessive use of the PUF cells.

Challenge-response authentication is a form of authentication in which one entity presents a question (i.e., the challenge) and another party must provide a valid answer (i.e., the response) to be authenticated. One example of a challenge-response protocol is password authentication, where the challenge is asking for the password and the valid response is the correct password. In some cases, multiple passwords may be used, each of them marked with an identifier. The verifier can ask for any of the passwords, and the other party must present the correct password associated with that identifier. If the passwords are chosen independently, an adversary who intercepts one challenge-response message pair will be unable to authenticate if a different identifier is presented. In another example, a challenge-response procedure may utilize a PUF.

A physical unclonable function (PUF), is a physical object that for a given input and conditions (i.e., a challenge), provides a physically-defined ""digital fingerprint"" output (i.e., the response) that serves as a unique identifier. For example, a PUF may be used for a semiconductor device such as a microprocessor. In some cases, PUFs are based on unique physical variations which occur naturally during semiconductor manufacturing. Thus, a PUF may be a physical entity embodied in a physical structure. PUFs may be usually implemented in integrated circuit, especially in applications with high security requirements.

In some examples, PUFs depend on the uniqueness of their physical microstructure, e.g., on random physical factors introduced during manufacturing. These factors may be unpredictable and uncontrollable, which makes it virtually impossible to duplicate or clone the structure. In some cases, rather than embodying a single cryptographic key, PUFs implement challenge-response authentication to evaluate this microstructure. For example, when a physical stimulus is applied to the structure, it reacts in an unpredictable (but repeatable) way due to the complex interaction of the stimulus with the physical microstructure of the device. The applied stimulus is called the challenge, and the reaction of the PUF is called the response. A specific challenge and its corresponding response together form a challenge-response pair or CRP. Thus, a device's identity may be established by the properties of the microstructure itself. In some cases, this structure is not directly revealed by the challenge-response mechanism, so a device is resistant to spoofing attacks.

The term unclonable refers to the fact that each PUF device has a unique and unpredictable way of mapping challenges to responses, even if it was manufactured with the same process as a similar device. Thus, it is infeasible to construct a PUF with the same challenge-response behavior as another given PUF because exact control over the manufacturing process is infeasible. Mathematically, unclonability means that it is very difficult compute an unknown response given the other CRPs or some of the properties of the random components from a PUF. This is because a response is created by a complex interaction of the challenge with many or all of the random components. In other words, given the design of the PUF system, without knowing all of the physical properties of the random components, the CRPs are highly unpredictable.

In some cases, an authentication process uses an internal response generated by a PUF block (i.e., in response to a challenge). The response may be generated by filtering invalid internal responses. However, filtering invalid internal responses in the authentication process may use resources of the electronic device.

According to some embodiments, screen information is generated by evaluating an internal response in a registration mode. For example, screen information can be generated by evaluating a plurality of initial internal responses generated for each of a plurality of challenges received from a server. The screen information may include information about internal challenges corresponding to valid initial internal responses. The screen information may also include valid bits for the internal challenges and a valid count after counting invalid internal challenges.

According to some embodiments, the internal challenges may be generated in response to challenges received in an authentication mode. The valid internal challenges may be selected from among the generated internal challenges using the screen information. A response may be generated using selected valid internal challenges. Thus, in some examples a response may be generated without using unnecessary PUF cells when the valid internal challenge and the response of a PUF cell are valid. Hereinafter, embodiments of the inventive concept will be described in detail with reference to the accompanying drawings.

FIG. 1 is a diagram illustrating a network system according to an embodiment.

Referring to FIG. 1, a network system 1 may include a host 20 and an integrated circuit 10, and the host 20 may include an authentication module 21. The host 20 may be a network system operated by an entity with an authenticated right of the integrated circuit 10, for example, a network system of a manufacturer of the integrated circuit 10. The host 20 may be implemented in the form of a server. The integrated circuit 10 may be connected to the host 20 using a wired or wireless network.

In a registration mode, the authentication module 21 may register the integrated circuit 10. In an embodiment, the authentication module 21 may output a plurality of challenges to the integrated circuit 10. Additionally or alternatively, the authentication module 21 may store the plurality of challenges and challenge-response pairs corresponding pairs of a plurality of responses respectively received in response to the plurality of challenges. The authentication module 21 may perform a registration operation according to the registration mode once during a life cycle of the integrated circuit 10, for example, after the integrated circuit 10 is manufactured. For example, the number of challenge-response pairs may be arbitrarily determined by the host 20 as equal to or greater than the number available for performing the authentication operation to authenticate the integrated circuit 10 during the life cycle thereof.

In the authentication mode, the authentication module 21 may perform the authentication operation on the integrated circuit 10.

In an embodiment, the authentication module 21 may arbitrarily determine any one challenge CHA of a plurality of challenges included in the challenge-response pairs generated in the registration mode, and may output the determined challenge CHA to the integrated circuit 10. Additionally or alternatively, the authentication module 21 may authenticate the integrated circuit 10 based on a response RES received from the integrated circuit 10 in response to the challenge CHA. In an embodiment, the authentication module 21 may authenticate the integrated circuit 10 based on whether the received response RES is the same as the response RES corresponding to the challenge CHA.

The integrated circuit 10 may be referred to as an integrated circuit or a device for challenge-response authentication. The integrated circuit 10 may generate the response RES corresponding to the challenge CHA. The integrated circuit 10 may be fabricated using a semiconductor process. Additionally or alternatively, the integrated circuit 10 may be packaged in a single package or respectively packaged in two or more packages.

The integrated circuit 10 may include an internal challenge generator 110. The internal challenge generator 110 may generate an internal challenge in response to the challenge CHA. In an embodiment, the internal challenge generator 110 may generate the internal challenge based on a non-linear function. For example, the internal challenge generator 110 may generate the internal challenge by applying the challenge CHA to a hash function (for example, cyclical redundancy check 32 (CRC32), message digest algorithm 5 (mda5), secure hash algorithm-1 (SHA-1), SHA-256, or race integrity primitives evaluation message digest-128 (RIPEMD-128). For example, the internal challenge generator 110 may generate the internal challenge by applying the challenge CHA to an encryption algorithm. For example, an encryption algorithm may be a data encryption standard (DES), triple DES, advanced encryption standard (AES), Rivest Shamir Adleman (RSA), or elliptic curve cryptosystem (ECC). For example, the internal challenge generator 110 may generate the internal challenge by applying the challenge CHA to a scramble function and scrambling data. In an embodiment, the internal challenge generator 110 may identify a valid internal challenge among the generated internal challenges in the authentication mode.

According to an embodiment of the inventive concept, the integrated circuit 10 may identify a valid internal challenge among a plurality of generated internal challenges. Additionally or alternatively, an embodiment of the inventive concept may generate the response RES using the valid internal challenge. In an embodiment, in the registration mode, the integrated circuit 10 may identify a valid initial internal challenge among the plurality of initial internal challenges generated in response to each of the plurality of challenges, and store information about the valid initial internal challenge. In the authentication mode, the integrated circuit 10 selects the valid internal challenge among the plurality of internal challenges generated in response to the challenge CHA based on the information about the valid initial internal challenge, and generate the response RES using the valid internal challenge.

For convenience of description, in the present specification, the initial internal challenge may be referred to as the internal challenge generated in the registration mode, and the initial internal response may be referred to as an internal response generated in the registration mode.

Figure 2:
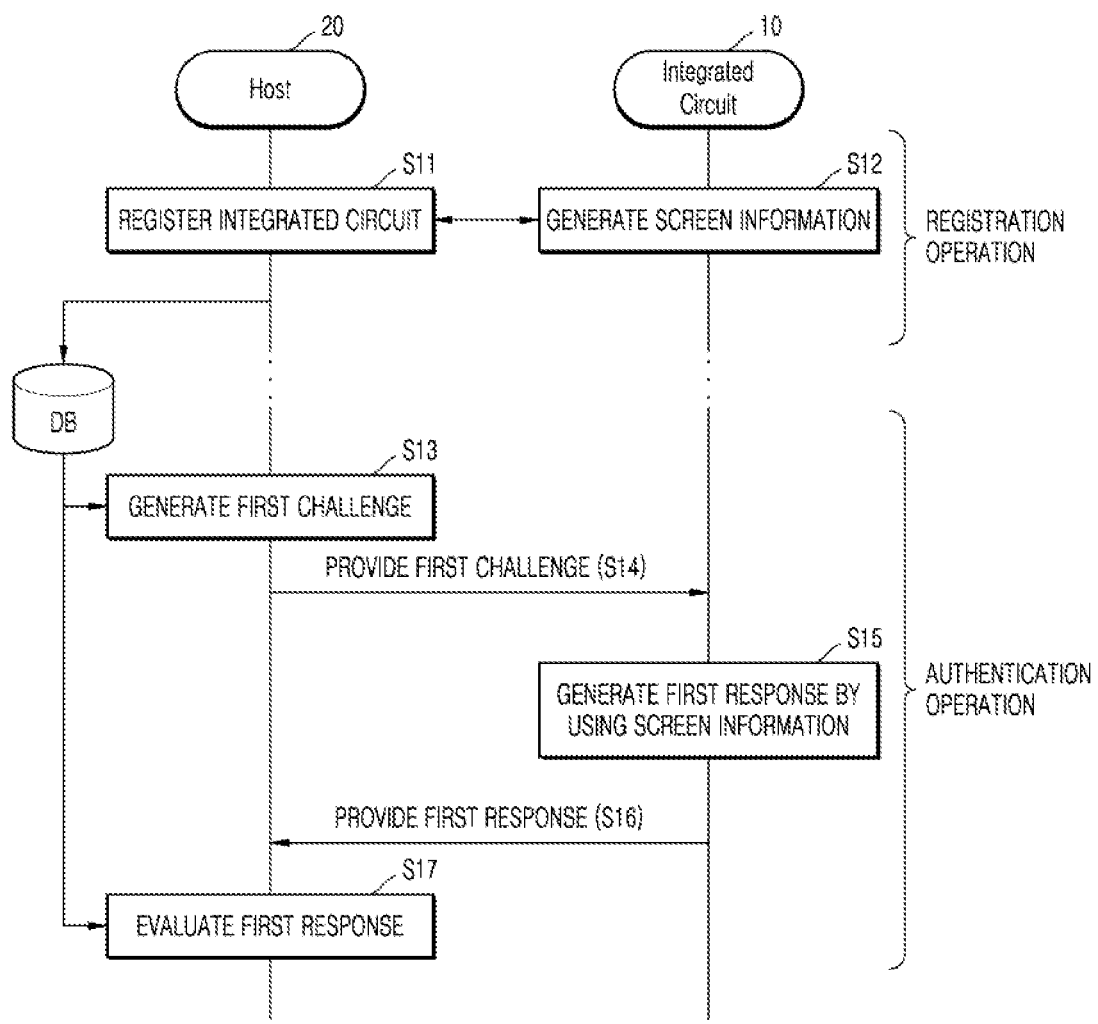
FIG. 2 is a flowchart of a method of using an integrated circuit, according to an embodiment.

FIG. 2 is a flowchart of a method of using the integrated circuit 10, according to an embodiment. FIG. 2 illustrates a method, performed by the host 20, of registering and authenticating the integrated circuit 10.

Referring to FIG. 2, the host 20 may register the integrated circuit 10 (S11), and the integrated circuit 10 may correspondingly proceed with the registration operation. For example, the host 20 may provide multiple challenges to the integrated circuit 10, and the integrated circuit 10 may provide the plurality of responses respectively corresponding to the plurality of challenges to the host 20. The host 20 may manage the challenge-response pairs including the plurality of challenges and the plurality of responses as a database DB.

In the registration operation, the integrated circuit 10 may generate screen information corresponding to each of the plurality of challenges (S12). In an embodiment, the integrated circuit 10 may generate the plurality of initial internal challenges corresponding to each of the plurality of challenges, and the screen information may include information about the valid initial internal challenges among the plurality of initial internal challenges. In an embodiment, the integrated circuit 10 may generate the initial internal responses respectively corresponding to the initial internal challenges. In some embodiments, the integrated circuit 10 may determine whether the initial internal challenge is valid based on a Hamming weight with respect to the initial internal challenges.

The screen information may refer to information about the validity of the internal challenges (i.e., in an authentication mode) or internal responses (i.e., in a registration mode). The screen information may therefore be used to screen the internal challenges or internal responses for validity. For example, the screen information may include a series of values representing whether each of a plurality of internal challenges or internal responses are valid. In one example, a value of '0' represents a valid internal challenge or a valid internal response and a value other than '0' represents an invalid internal challenge or a valid internal response.

A Hamming weight is a number of symbols that are different from the zero-symbol of the alphabet used. Therefore, Hamming weight is equivalent to the Hamming distance (a number of positions at which a corresponding symbol is different) from the all-zero string of the same length. This is described later in detail with reference to FIG. 6 and the like. In an embodiment, the integrated circuit 10 may store the generated screen information in an internal storage device. In an embodiment, the integrated circuit 10 may output the generated screen information to the host 20, and the host 20 may store the generated screen information.

The host 20 may enter the authentication operation at a certain time after the registration operation is completed. In the authentication operation, the host 20 may select any one challenge-response pair among the challenge-response pairs stored in the database DB to authenticate the integrated circuit 10, and may generate a first challenge including the selected challenge-response pair (S13). The host 20 may provide the generated first challenge to the integrated circuit 10 (S14).

The integrated circuit 10 may receive the first challenge, and generate a first response using the screen information (S15). In an embodiment, the integrated circuit 10 may generate the plurality of internal challenges using the first challenge and may identify the valid internal challenge among the plurality of internal challenges using the screen information. The integrated circuit 10 may generate the first response using the valid internal challenge. The integrated circuit 10 may provide the generated first response to the host 20 (S16).

The host 20 may evaluate the received first response (S17). For example, the host 20 may estimate a response corresponding to the first challenge using the database DB. Additionally or alternatively, the host 20 may evaluate the first response by comparing the estimated response with the first response. When the estimated response matches the first response, the host 20 may determine the authentication of the integrated circuit 10 as a success, and otherwise, may determine the authentication of the integrated circuit 10 as a failure.

Figure 3:
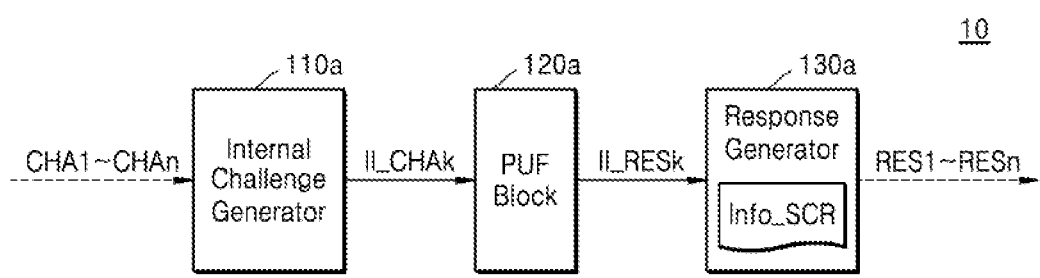
FIG. 3 is a block diagram illustrating an integrated circuit according to an embodiment.

FIG. 3 is a block diagram illustrating the integrated circuit 10 according to an embodiment. FIG. 3 illustrates an operation of the integrated circuit 10 in the registration mode. Duplicate descriptions previously given with reference to FIG. 1 are omitted.

Referring to FIG. 3, the integrated circuit 10 may include an internal challenge generator 110a, a physically unclonable function (PUF) block 120a, and a response generator 130a. The internal challenge generator 110a may perform an operation identical or similar to the operation in the registration mode of the internal challenge generator 110 in FIG. 1.

In the registration mode, the internal challenge generator 110a may receive a plurality of challenges CHA1~CHAn from outside (for example, the host 20 in FIG. 1). The plurality of challenges CHA1~CHAn may include a set of challenges usable as challenge-response pairs, and may be arbitrarily determined by the host 20. The number of the plurality of challenges CHA1~CHAn may correspond to the number of times when the integrated circuit 10 is authenticated during the life cycle thereof, and may be arbitrarily determined by the host 20.

The internal challenge generator 110a may sequentially generate the plurality of initial internal challenges II_CHAk corresponding to each of the plurality of challenges CHA1~CHAn using a conversion algorithm. For example, a plurality of initial internal challenges may be generated in response to one challenge. In an embodiment, the conversion algorithm may include any one of the encryption algorithm, the hash algorithm, and the scramble algorithm described above with reference to FIG. 1.

The PUF block 120a may sequentially receive the plurality of initial internal challenges II_CHAk, and sequentially generate a plurality of initial internal responses II_RESk respectively corresponding thereto. The PUF block 120a may include a plurality of PUF source circuits. The PUF source circuit may generate a signal with a unique value according to the PUF, and in the present specification, may be referred to as a PUF cell. The PUF may be referred to as providing a unique value corresponding to hardware based on intrinsic characteristics of associated hardware. For example, each of the plurality of pieces of hardware may not be identical to each other even when a plurality of pieces of hardware such as semiconductor chips are fabricated by the same process. Slight variations may occur in the plurality of pieces of hardware. Based on the variations, the unique value of the hardware may be extracted, and the extracted value may be used for applications with security, such as security communication, security data processing, user identification, and firmware update.

In some embodiments, the PUF source circuit included in the PUF block 120a may have any structure that generates a bit signal of the unique value. The PUF source circuit may, as a non-limiting example, include a static random access memory (RAM) (SRAM)-type PUF structure based on a value stored in an SRAM cell, a ring oscillator structure based on frequency fluctuation, a leakage-based PUF structure based on leakage current or the like, or an arbiter PUF structure in which a signal path is arbitrarily determined. Additionally or alternatively, the PUF source circuit may generate the bit signal of the unique value based on differences in threshold levels of logic gates.

The PUF block 120a may generate the initial internal response II_RESk based on signals generated by the plurality of PUF source circuits and the initial internal attempt II_CHAk. Accordingly, the initial internal response II_RESk may be different from an initial internal response generated from the same initial internal challenge II_CHAk by the PUF block included in another integrated circuit of the same structure. In some embodiments, the PUF block 120a may generate the initial internal responses II_RESk of n-bits (where n is an integer greater than 1). For example, the PUF block 120a may include n of the PUF source circuits, and one PUF source circuit may generate a bit signal corresponding to 1-bit.

The response generator 130a may receive the initial internal response II_RESk, and may sequentially generate a plurality of responses RES1~RESn from the initial internal response II_RESk. Additionally or alternatively, the response generator 130a may generate screen information Info_SCR based on the initial internal response II_RESk. In an embodiment, the response generator 130a may generate the screen information Info_SCR based on the Hamming weight of the initial internal response II_RESk of n-bits (where n is a natural number)."

The Hamming weight of a string is the number of symbols that are different from a zero-symbol of the alphabet in use. The Hamming weight is equivalent to the Hamming distance from the all-zero string of the same length. Given a string of binary bits, the Hamming weight is the number of 1's in the string, or the digit sum of the binary representation of a given number and the $l_1$ norm of a bit vector. In the binary case, the Hamming weight may also be referred to as the population count, popcount, sideways sum, or bit summation. Accordingly, the Hamming weight HW (refer to FIG. 6) of the initial internal response II_RESk of n-bits may have a value of 0 through n.

The initial internal response II_RESk generated by the PUF block 120a may be different from the internal response generated by another integrated circuit. Accordingly, the Hamming weights of the internal responses generated by the integrated circuits may have a distribution between 0 and n. For example, while the number of integrated circuits that generate the initial internal response II_RESk with the Hamming weight of approximately n/2 is relatively large, the number of integrated circuits that generate the initial internal response II_RESk with the Hamming weight of approximately 0 or n may be relatively small.

For a success of challenge-response authentication, a constant response corresponding to the same challenge may be generated. The response generator 130a may prevent an accumulation of errors that may occur in the PUF block 120a, by generating the plurality of responses RES1~RESn based on the Hamming weight. For example, while at least some of the plurality of PUF source circuits included in the PUF block 120a may generate a bit signal of a constant value, the other of the plurality of PUF source circuits may generate a bit signal of a variable value according to conditions (for example, time, temperature, voltage, or the like). While the former is referred to as a stable PUF source circuit, the latter may be referred to as an unstable PUF source circuit. When a plurality of bit signals output by the plurality of PUF source circuits are merged using logical operations (for example, AND, OR, or the like) to generate a response, an error may occur due to the unstable PUF source circuits. In other words, errors in the unstable PUF source circuits may be accumulated in the response. However, as described later, as the Hamming weight is used in the generation operation of the response by the response generator 130a, the accumulation of errors due to the unstable PUF source circuits may be prevented, and as a result, a constant response corresponding to the same challenge may be generated.

In an embodiment of the inventive concept, the response generator 130a may determine whether the initial internal response II_RESk is valid based on the Hamming weight HW of the initial internal response II_RESk, and may generate information about the initial internal challenge II_CHAk corresponding to the valid initial internal response II_RESk as the screen information Info_SCR. Additionally or alternatively, in the authentication mode to be described later in FIG. 9 and the like, errors may be generated in the PUF block 120a may be prevented in advance by selecting the valid internal challenge using the screen information Info_SCR.

In an embodiment, the internal challenge generator 110a, the PUF block 120a, and the response generator 130a may operate independently of each other. In other words, after the internal challenge generator 110a generates first initial internal challenges corresponding to a first challenge, the PUF block 120a may generate a first initial internal response corresponding to the first initial internal challenges while generating second initial internal challenges corresponding to a second challenge. Additionally or alternatively, the response generator 130a may also generate a response, independently of the internal challenge generator 110a and the PUF block 120a. As described above, the integrated circuit 10 according to the technical idea of the inventive concept may quickly and efficiently perform a response generation operation corresponding to a challenge from the host 20 because each component of the integrated circuit 10 operates independently.

Figure 4:
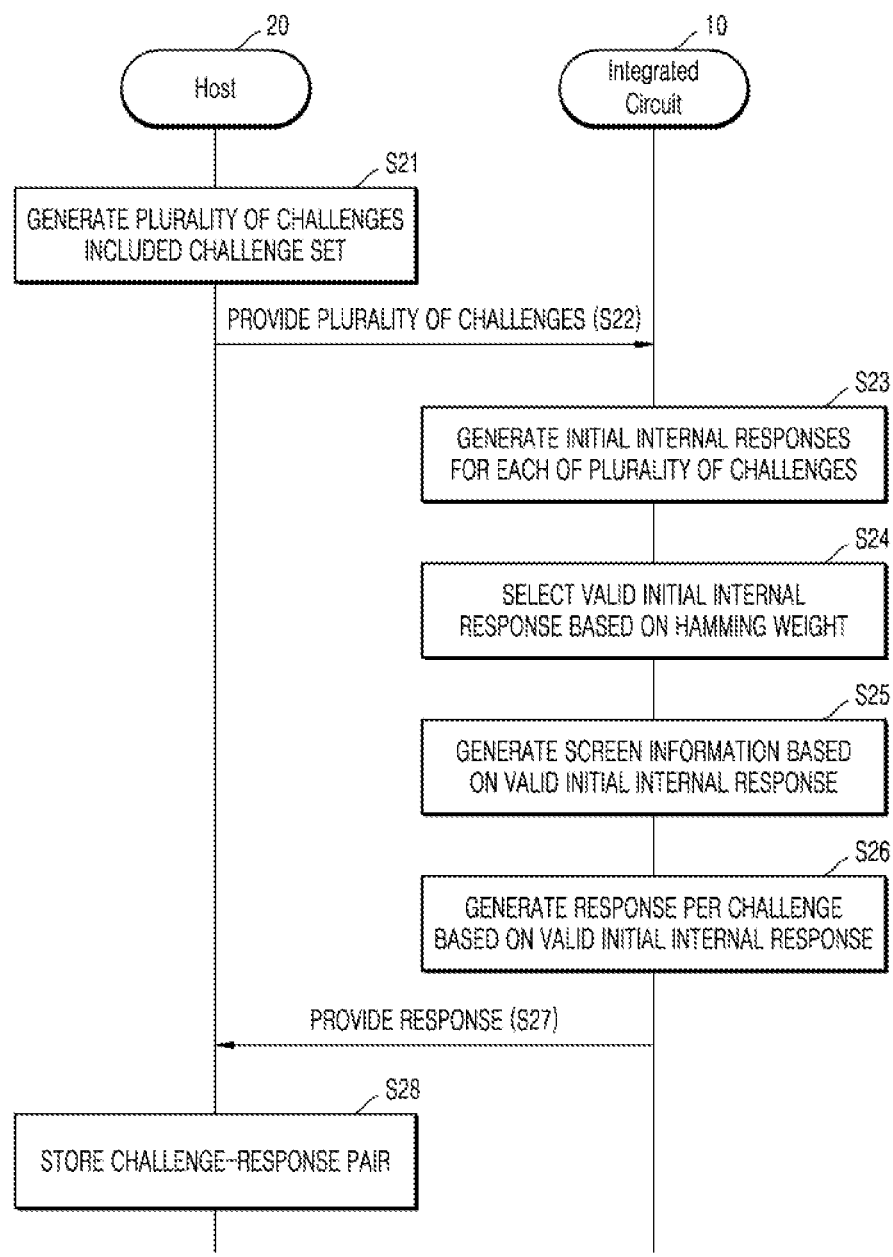
FIG. 4 is a flowchart of a method of using an integrated circuit, according to an embodiment.

FIG. 4 is a flowchart of a method of using the integrated circuit 10, according to an embodiment. FIG. 4 illustrates a method of using the integrated circuit 10 in the registration mode.

Referring to FIG. 4, the host 20 may generate a plurality of challenges included in a challenge set (S21), and provide the generated plurality of challenges to the integrated circuit 10 (S22). The integrated circuit 10 may sequentially generate initial internal responses corresponding to the plurality of challenges (S23). In an embodiment, the integrated circuit 10 may include the PUF block 120a. The integrated circuit 10 may generate the plurality of initial internal challenges corresponding to each of the plurality of challenges, and using the PUF block 120a, may sequentially generate the plurality of initial internal challenges that change according to the plurality of initial internal challenges.

The integrated circuit 10 may select the valid initial internal response among the plurality of initial internal responses based on the Hamming weight (S24). In an embodiment, the integrated circuit 10 may calculate the Hamming weight for each of the plurality of initial internal responses and determine the validity of each of the plurality of initial internal responses by comparing the calculated Hamming weight with a reference value.

The integrated circuit 10 may generate the screen information based on the valid initial internal response (S25). In an embodiment, the screen information may include information about the valid initial internal challenge corresponding to the valid initial internal response. In an embodiment, the screen information may include information about the valid initial internal response.

The integrated circuit 10 may generate a response for each of a plurality of challenges based on the valid initial internal response (S26). The integrated circuit 10 may then provide the generated response to the host 20 (S27). The host 20 may receive the generated response, and store a challenge-response pair including a response and a challenge corresponding to the response (S28). In an embodiment, the integrated circuit 10 may transfer the generated screen information to the host 20. The host 20 may store the transferred screen information.

Figure 5:
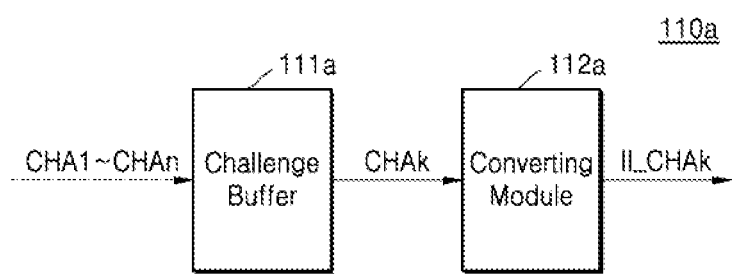
FIG. 5 is a block diagram illustrating an internal challenge generator according to an embodiment.

FIG. 5 is a block diagram illustrating the internal challenge generator 110a according to an embodiment. FIG. 5 illustrates an operation of the internal challenge generator 110a in the registration mode. Duplicate descriptions given with reference to FIG. 3 are omitted.

Referring to FIG. 5, the internal challenge generator 110a may include a challenge buffer 111a and a converting module 112a. In the registration mode, the challenge buffer 111a may store a plurality of challenges CHA1~CHAn received from the outside (for example, the host 20 in FIG. 1), and the converting module 112a may sequentially read the plurality of challenges CHA1~CHAn from the challenge buffer 111a. As a result, the challenge buffer 111a may include at least one storage device, and the at least one storage device may include a memory cell such as an SRAM cell, a dynamic RAM (DRAM) cell, a flash memory cell, a magnetoresistive RAM (MRAM) cell, and a phase-change RAM (PRAM) cell, but is not limited thereto.

The converting module 112a may read a first challenge CHAk from the challenge buffer 111a, and using the conversion algorithm, may sequentially generate a plurality of first initial internal challenges II_CHAk from the first challenge CHAk. In an embodiment, the converting module 112a may receive the first challenge CHAk of n-bits, and generate m of the plurality of first initial internal challenges II_CHAk by applying the first challenge CHAk to the conversion algorithm, and each of the m of the plurality of first initial internal challenges II_CHAk may include 1-bit data.

In an embodiment, the conversion algorithm may include an encryption algorithm, a hash algorithm, and a scramble algorithm, and the converting module 112a may generate the plurality of first initial internal challenges II_CHAk by repeatedly applying the conversion algorithm to the first challenge CHAk. For example, the converting module 112a may generate the first initial internal challenge by applying the conversion algorithm once to the first challenge CHAk, and may generate m$^{th}$ initial internal challenge by applying the conversion algorithm to the first challenge CHAk for m times.

Although not illustrated in FIG. 5, as described in FIG. 3, the plurality of first initial internal challenges II_CHAk may be output to the PUF block 120a, and the plurality of first initial internal responses II_RESk uniquely corresponding to each of the plurality of initial internal challenges II_CHAk may be generated by the PUF block 120a.

Figure 6:
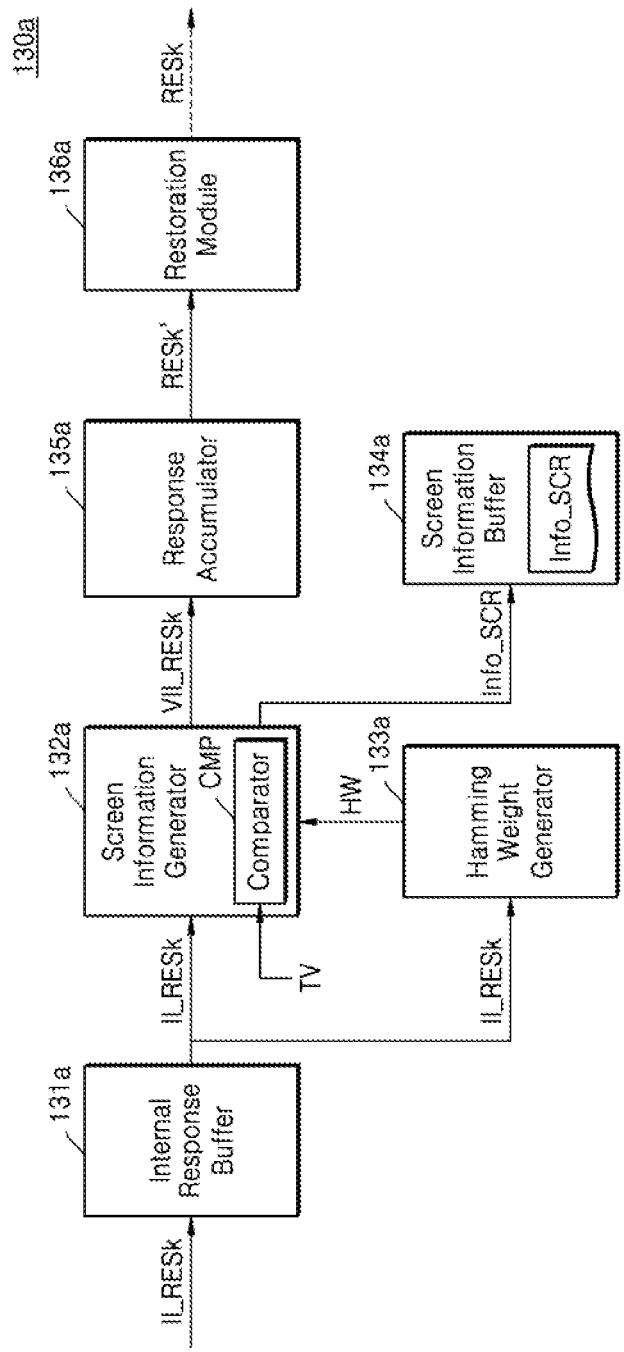
FIG. 6 is a block diagram illustrating a response generator according to an embodiment.

FIG. 6 is a block diagram illustrating the response generator 130a according to an embodiment. FIG. 6 illustrates an operation of the response generator 130a in the registration mode. Duplicate descriptions given with reference to FIG. 3 are omitted.

Referring to FIG. 6, the response generator 130a may include an internal response buffer 131a, a screen information generator 132a, a Hamming weight generator 133a, a screen information buffer 134a, a response accumulator 135a, and a restoration module 136a.

In the registration mode, the internal response buffer 131a may store the plurality of first initial internal responses II_RESk received from the PUF block (refer to 120a in FIG. 3). The screen information generator 132a and the Hamming weight generator 133a may sequentially read the plurality of first initial internal responses II_RESk from the internal response buffer 131a. As a result, the internal response buffer 131a may include at least one storage device, and the at least one storage device may include an SRAM cell, a DRAM cell, a flash memory cell, an MRAM cell, a PRAM cell, or the like, but is not limited thereto.

The Hamming weight generator 133a may generate the Hamming weight HW for each of the plurality of first initial internal responses II_RESk read from the internal response buffer 131a. An operation of generating the Hamming weight HW by the Hamming weight generator 133a is described later in detail with reference to FIG. 7 and the like. The Hamming weight generator 133a may output the generated Hamming weight HW to the screen information generator 132a.

The screen information generator 132a may determine whether the plurality of first initial internal responses II_RESk are valid based on the Hamming weight HW. In an embodiment, the screen information generator 132a may include a comparator CMP. The comparator CMP may compare the Hamming weight HW with at least one reference value TV, and the screen information generator 132a may generate a valid bit for the validity of each of the plurality of first initial internal responses II_RESk based on the comparison result and may generate the screen information Info_SCR using the valid bit.

The screen information generator 132a may store the generated screen information Info_SCR in the screen information buffer 134a, and the screen information Info_SCR stored in the screen information buffer 134a may be used later in an authentication process. The screen information buffer 134a may include at least one storage device, and the at least one storage device may include an SRAM cell, a DRAM cell, a flash memory cell, an MRAM cell, a PRAM cell, or the like, but is not limited thereto. In FIG. 6, in an embodiment, the internal response buffer 131a and the screen information buffer 134a are illustrated as separate components. The internal response buffer 131a and the screen information buffer 134a may be configured as one storage device.

The screen information generator 132a may select a valid first initial internal response VII_RESk among the plurality of initial internal responses II_RESk based on the validity bit, and may output the valid first initial internal response VII_RESk to the response accumulator 135a. The response accumulator 135a may generate a first original response RESk' by accumulating the valid first initial internal responses VII_RESk.

The restoration module 136a may generate the first response RESk by applying a restoration algorithm to the first original response RESk', and may output the generated first response RESk to the outside (for example, the host 20 in FIG. 1). For example, the first response RESk may be a response corresponding to the first challenge (CHAk in FIG. 4). In an embodiment, the restoration algorithm may mean an algorithm for restoring data converted by the internal challenge generator 110a, and may include any one of a decryption algorithm, a hash algorithm, and a descramble algorithm. In an embodiment, the restoration algorithm may be determined according to the conversion algorithm used by the internal challenge generator 110a.

A decryption algorithm may refer to a process for decrypting data. Encryption is the process of translating data into something that appears to be random. Decryption is the process of converting the encrypted data back into its original form. Symmetric encryption may be used to encrypt large amounts of data. For example, a symmetric key may be used during both the encryption and decryption processes. In some examples, an encryption algorithm may be used to make it as difficult as possible to decrypt the data without using the key. In some cases, there may be no technique significantly better than trying every possible key. For such an algorithm, using a longer key makes it more difficult to decrypt the data without the key. Examples of encryption algorithms include algorithms based on a data encryption standard (DES), triple DES, advanced encryption standard (AES), Rivest Shamir Adleman (RSA), or elliptic curve cryptosystem (ECC).

A hash function is a function that can be used to map data of various sizes to a fixed-size values. The values returned by a hash function are referred to as hash values, hash codes, digests, or simply hashes. The values may be used to index a fixed-size table called a hash table. Use of a hash function to index a hash table is called hashing or scatter storage addressing. In some cases, hash functions and their associated hash tables are used in data storage and retrieval applications to access data in a small and nearly constant time, using storage space only fractionally greater than the total space required for the data or records themselves. Thus, hashing is a computationally and storage space efficient form of data access which avoids the non-linear access time of ordered and unordered lists and structured trees. In some cases, a hash function may avoid exponential storage requirements of direct access of state spaces of large or variable-length keys. In some cases, the use of hash functions relies on statistical properties of key and function interaction. hash functions may also be used in information security applications such as cryptography.

A scrambling algorithm is a function that transposes, inverts or otherwise encodes data to make the data unintelligible to a receiver that is not equipped with the corresponding descrambling algorithm. The descrambling algorithm enables decoding of the data. Whereas encryption refers to operations carried out in the digital domain, scrambling often refers to operations carried out in the analog domain. In some cases, scrambling is accomplished by the addition of components to the original signal or the changing of some important component of the original signal in order to make extraction of the original signal difficult. Examples of the latter might include removing or changing vertical or horizontal sync pulses. In some cases, scramblers are also capable of encryption devices. In some cases, a scrambler manipulates a data stream before transmission. The manipulations may be reversed by a descrambler at the receiving side. According to one example, a scrambler replaces sequences into other sequences without removing undesirable sequences.

In an embodiment, the screen information generator 132a and the Hamming weight generator 133a may be used in the registration mode, and may be disabled after the registration mode is completed. In the authentication mode, a response may be generated without determining the valid internal response using the screen information Info_SCR. This is described later in detail with reference to FIG. 12.

Figure 7:
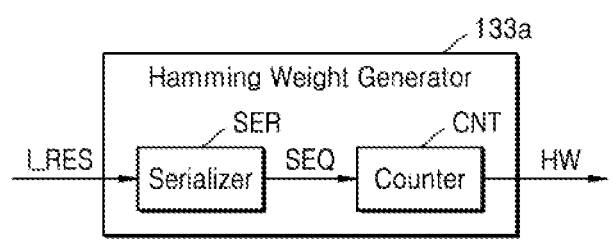
FIG. 7 is a block diagram illustrating a Hamming weight generator according to an embodiment.

FIG. 7 is a block diagram illustrating the Hamming weight generator 133a according to an embodiment.

Referring to FIG. 7, the Hamming weight generator 133a may receive the initial internal response II_RES of n-bits, and may generate the hamming weight HW of the initial internal response II_RES. As a result, the Hamming weight generator 133a may include a serializer SER and a counter CNT.

To generate the Hamming weight HW of the initial internal response II_RES, the Hamming weight generator 133a with a reduced power and size may be used. For example, the integrated circuit 10 in FIG. 1 may be included in a device with low power and size among devices for internet of things (IoT). Accordingly, the Hamming weight generator 133a may generate the Hamming weight HW by serializing internal responses I_RES and counting the serialized internal responses I_RES as to be described later, instead of adding each bit of the internal response I_RES.

The serializer SER may generate a pulse sequence SEQ by serializing the internal responses I_RES. Accordingly, the pulse sequence SEQ may include a series of pulses according to the bits of the internal responses I_RES. The serializer SER may have any structure for serializing the internal responses I_RES. The counter CNT may receive the pulse sequence SEQ from the serializer SER, and output the Hamming weight HW by counting pulses of the pulse sequence SEQ. The counter CNT may have any structure for counting pulses of the pulse sequence SEQ, and in some embodiments, may include a ripple counter.

Figure 8:
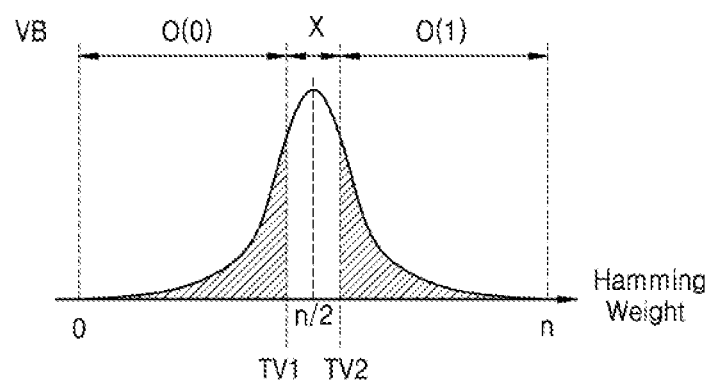
FIG. 8 is a graph illustrating a distribution of Hamming weights, according to an embodiment.

FIG. 8 is a graph illustrating a distribution of the Hamming weight HW, according to an embodiment.

Referring to FIGS. 6 and 8, the comparator CMP may determine the validity bit by determining the Hamming weight HW based on two or more reference values, for example, a first reference value TV1 and a second reference value TV2. In the example of FIG. 7, the comparator CMP may assign '0' as a value for the initial internal response with a Hamming weight HW less than the first reference value TV1, and may assign a first value indicating the validity 'O' (for example, '1') to a valid bit VB. The comparator CMP may assign '1' as a value for the initial internal response with the Hamming weight HW greater than the second reference value TV2, and may assign the first value indicating the validity 'O' (for example, '1') to the valid bit VB.

The comparator CMP may assign a second value indicating non-validity 'X' (for example, '0') to the validity bit VB for the initial internal response with the Hamming weight HW greater than the first reference value V1 and less than the second reference value TV2. In an embodiment of the inventive concept, the screen information generator 132a may determine an initial internal response indicating the first value as the validity bit VB among a plurality of initial internal responses, and may generate a response using the valid initial internal response. Additionally or alternatively, the screen information generator 132a may generate the screen information using the validity bit VB corresponding to each initial internal response.

When the Hamming weight HW is compared with the first reference value TV1 and the second reference value TV2, which are different from each other, the Hamming weight HW with which the value of the initial internal response is affected by the unstable PUF source circuits may be neglected, and even when the bit signals of the unstable PUF source circuits change, the value of the initial internal response may be maintained constant. In some embodiments, the first reference value TV1 and the second reference value TV2 may be determined based on a percentage of data. For example, the unstable PUF source circuits may be accumulated while the integrated circuit 10 is fabricated.

Figure 9A:
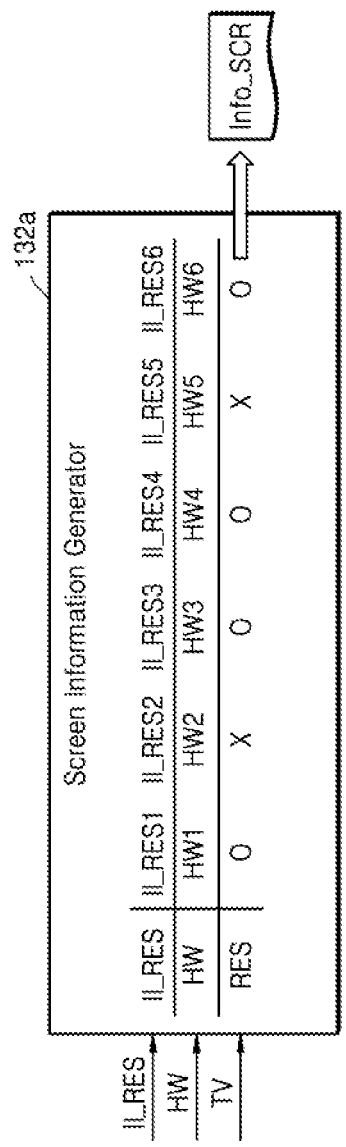
FIGS. 9A through 9C are diagrams illustrating operations of screen information generators, respectively, according to embodiments.
Figure 9B:
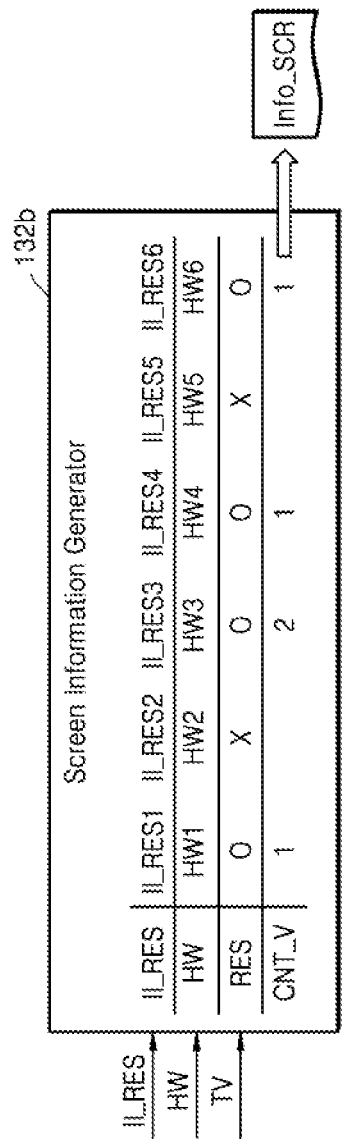
Figure 9C:
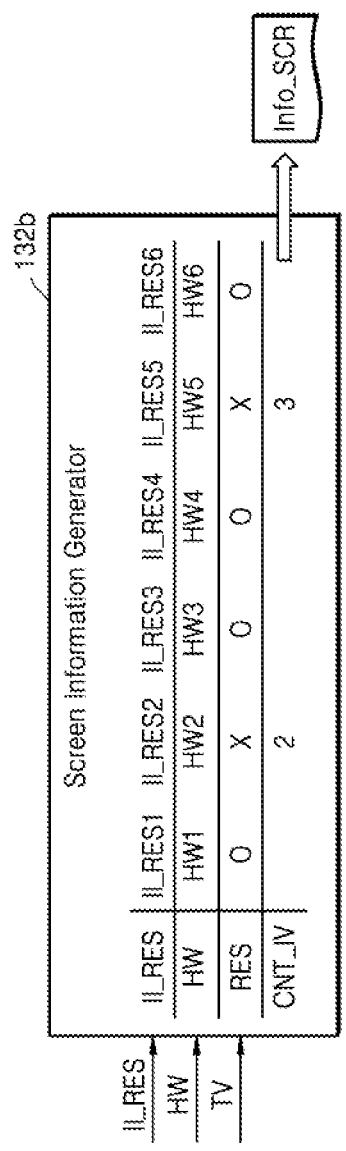

FIGS. 9A through 9C are diagrams illustrating operations of screen information generators 132a, 132b, and 132c, respectively, according to embodiments.

Referring to FIGS. 6 and 9A, the screen information generator 132a may receive the plurality of initial internal responses II_RES from the internal response buffer 131a, and may receive the Hamming weight HW for each of the plurality of initial internal responses II_RES from the Hamming weight generator 133a. The screen information generator 132a may include the comparator CMP, and the comparator CMP may generate the validity bit VB by comparing the reference value TV with the Hamming weight HW.

In the example of FIG. 9A, the plurality of initial internal responses II_RES may include a first initial internal response II_RES1 through a sixth initial internal response II_RES6, and the screen information generator 132a may determine the first initial internal response II_RES1, the third initial internal response II_RES3, the fourth initial internal response II_RES4, and the sixth initial internal response II_RES6 as the valid initial internal responses, and correspondingly assign the first value of 'O' to the valid bit VB. Additionally or alternatively, the screen information generator 132a may determine the second initial internal response II_RES2 and the fifth initial internal response II_RES5 as the invalid initial internal responses, and correspondingly assign the second value of 'X' to the valid bit VB. The screen information generator 132a may store the validity bit VB for each initial internal response as the screen information Info_SCR. In the example of FIG. 8A, the screen information generator 132a may store '1' corresponding to the first value 'O' and store '0' corresponding to the second value 'X', and then may generate '101101' as the screen information Info_SCR.

Referring to FIGS. 6 and 9B, the screen information generator 132b may further include a counter that counts the number of first through sixth initial internal responses II_RES1 through II_RES6 until the first value 'O' of the validity bit VB appears. The counter CNT may generate '1' as a valid count CNT V corresponding to the first initial internal response II_RES1 because the initial internal response is a first initial internal response II_RES1 until the first value 'O' appears from the first initial internal response II_RES1". Next, the initial internal responses are two of the second internal response II_RES2 and the third initial internal response II_RES3 until the first value 'O' appears from the second initial internal response II_RES2, the counter CNT may generate '2' as the valid count CNT V corresponding to the third initial internal response II_RES3.

Similarly, because the initial internal response is the fourth initial internal response II_RES4 until the first value 'O' from the fourth initial internal response II_RES4 appears, the counter CNT may generate '1' as the valid counter CNT V corresponding to the fourth initial internal response II_RES4, and thereafter, because the initial internal responses are the fifth initial internal response II_RES5 and the sixth initial internal response II_RES6 until the first value 'O' from the fifth initial internal response II_RES5 appears, the counter CNT may generate '2' as the valid count CNT V corresponding to the sixth initial internal response II_RES6.

The screen information generator 132b may generate the valid count CNT V as the screen information Info_SCR. In the example of FIG. 9B, the screen information generator 132b may store '1212', which is generated as the valid count CNT V, as the screen information Info_SCR.

Referring to FIGS. 6 and 9C, the screen information generator 132b may further include a counter used to count a number of first through sixth initial internal responses II_RES1 through II_RES6 until the second value 'X' of the validity bit VB appears. The counter CNT may generate '2' as an invalid count CNT_IV corresponding to the second initial internal response II_RES2 because the initial internal responses are two of the first internal response II_RES1 and the second initial internal response II_RES2 until the second value 'X' appears from the first initial internal response II_RES1". Next, the counter CNT may generate '3' as the invalid count CNT_IV corresponding to the fifth initial internal response II_RES5 because the initial internal responses are three of the third internal response II_RES3, the fourth initial internal response II_RES4, and the fifth initial internal response II_RES5 until the second value 'X' appears from the fourth initial internal response II_RES4".

The screen information generator 132c may generate the invalid count CNT_IV as the screen information Info_SCR. In the example of FIG. 9C, the screen information generator 132c may store '23', which is generated as the invalid count CNT_IV, as the screen information Info_SCR.

Figure 10:
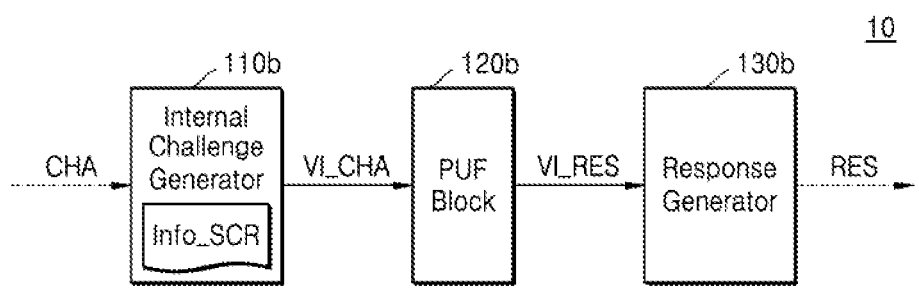
FIG. 10 is a block diagram illustrating an integrated circuit according to an embodiment.

FIG. 10 is a block diagram illustrating the integrated circuit 10 according to an embodiment. FIG. 10 illustrates an operation of the integrated circuit 10 in the authentication mode. Duplicate descriptions given with reference to FIGS. 1 and 3 are omitted.

Referring to FIG. 10, the integrated circuit 10 may include an internal challenge generator 110b, a PUF block 120b, and a response generator 130b. Each of the internal challenge generator 110b, the PUF block 120b, and the response generator 130b in FIG. 10 may be configured identically or similar to the internal challenge generator 110a, the PUF block 120a, and the response generator 130a in FIG. 3, respectively. FIG. 10 illustrates an embodiment that each of the internal challenge generator 110b, the PUF block 120b, and the response generator 130b operates in the authentication mode. Accordingly, duplicate descriptions given above with reference to FIG. 3 for the internal challenge generator 110b, the PUF block 120b, and the response generator 130b are omitted.

In the authentication mode, the internal challenge generator 110b may receive the first challenge CHA from the outside (for example, the host 20 in FIG. 1). The first challenge CHA may be any one of the plurality of challenges CHA1~CHAn used in the registration mode of FIG. 3. The internal challenge generator 110b may receive the screen information Info_SCR. In an embodiment, the internal challenge generator 110b may receive the screen information Info_SCR from the host 20. In an embodiment, the internal challenge generator 110b may read the screen information Info_SCR from a storage device included in the integrated circuit 10.

The internal challenge generator 110b may sequentially generate a plurality of internal challenges corresponding to the first challenge CHA using a conversion algorithm. According to an embodiment of the inventive concept, the internal challenge generator 110b may select the valid internal challenge VI_CHA from among the plurality of internal challenges based on the screen information Info_SCR generated in the registration mode.

When the validity bit VB is stored in the screen information Info_SCR as illustrated in FIG. 9A, the internal challenge generator 110b may select the internal challenge, which corresponds to the initial internal response with the first value 'O' as the validity bit VB, as a valid internal challenge VI_CHA.

When the valid count CNT V is stored in the screen information Info_SCR as illustrated in FIG. 9B, the internal challenge generator 110b may select the valid initial internal response by counting the initial internal response with the first value 'O' as the validity bit VB based on the valid count CNT V, and select the internal challenge corresponding to the valid initial internal response as the valid internal challenge VI_CHA.

When the invalid count CNT_IV is stored in the screen information Info_SCR as illustrated in FIG. 9C, the internal challenge generator 110b may select the invalid initial internal response by counting the initial internal response with the second value 'X' as the validity bit VB based on the invalid count CNT_IV, and select the internal challenge, which corresponds to the valid initial internal response selected by excluding the invalid initial internal response, as the valid internal challenge VI_CHA.

The PUF block 120b may receive the valid internal challenge VI_CHA, and sequentially generates the valid internal response VI_RES corresponding thereto. Because a filtering operation for the invalid internal response has been performed by the screen information Info_SCR, the valid internal response VI_RES may include valid data with a value of '1' or '0' based on the Hamming weight.

The response generator 130b may receive the valid internal response VI_RES, and may generate the first response RES by accumulating or concatenating the valid internal response VI_RES. In an embodiment, the first response RES may be the same as the response generated in response to the first challenge CHA in the registration mode. In an embodiment, the response generator 130b may generate the first response RES based on the Hamming weight of the valid internal response VI_RES.

According to an embodiment of the inventive concept, the internal challenge generator 110b may select the valid internal challenge VI_CHA from among the plurality of internal challenges using the screen information Info_SCR generated in the registration mode. Additionally or alternatively, the integrated circuit 10 may prevent an unnecessary invalid internal challenge from being applied to the PUF block 120b by generating the first response RES using the valid internal challenge VI_CHA. As a result, the speed of authentication may be increased.

Figure 11:
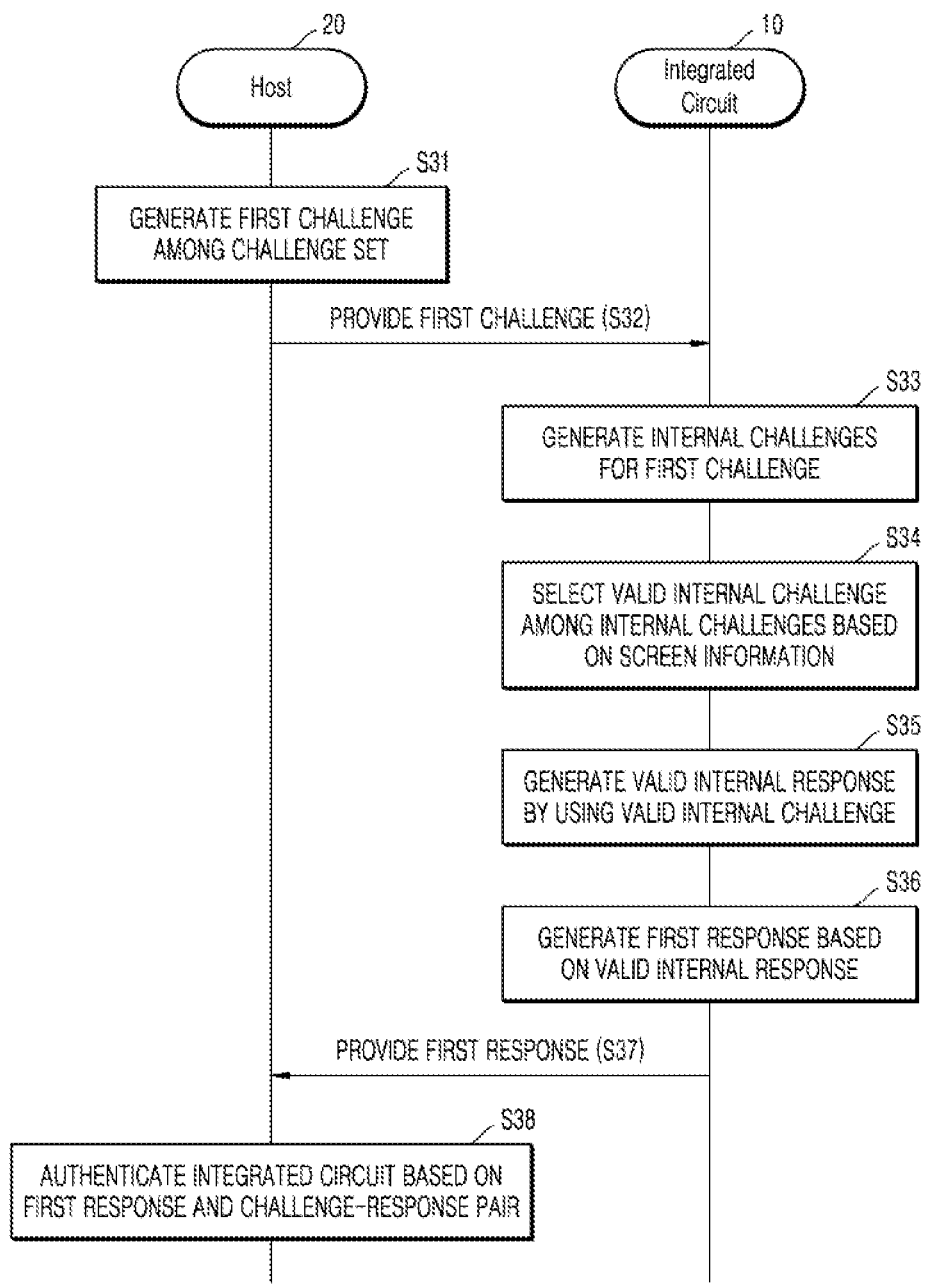
FIG. 11 is a flowchart of a method of using an integrated circuit, according to an embodiment.

FIG. 11 is a flowchart of a method of using the integrated circuit 10, according to an embodiment. FIG. 11 illustrates a method of using the integrated circuit 10 in the authentication mode.

Referring to FIG. 11, the host 20 may generate a first challenge among the plurality of challenges included in the set of challenges generated in the registration process (S31), and may provide the generated first challenge to the integrated circuit 10 (S32). The integrated circuit 10 may generate the internal challenges for the first challenge (S33). The integrated circuit 10 may select the valid internal challenge from the internal challenges based on screen information (S34). In an embodiment, the valid internal challenge may be the internal challenge corresponding to the initial internal response determined as valid during the registration process. As a result, the integrated circuit 10 may receive the screen information. In an embodiment, the integrated circuit 10 may receive the screen information from the host 20.

The integrated circuit 10 may generate the valid internal response using the selected valid internal challenge (S35). In an embodiment, the integrated circuit 10 may generate, as the valid internal response, data that changes according to the valid internal challenge by a PUF block. The integrated circuit 10 may generate the first response based on the valid internal response (S36), and provide the generated first response to the host 20 (S37).

The host 20 may authenticate the integrated circuit 10 based on the received first response and the challenge-response pair stored in database (S38). In an embodiment, the host 20 may authenticate the integrated circuit 10 by receiving a response corresponding to the first challenge from the database DB and comparing the response received from the database with the first response. For example, when the response received from the database is the same as the first response, the host 20 may determine that authentication for the integrated circuit 10 is successful, and when the response received from the database is not the same as the first response, the host 20 may determine that authentication for the integrated circuit 10 is unsuccessful.

Thus, according to an aspect of the inventive concept, a method of authenticating an integrated circuit includes receiving an authentication challenge while in an authentication mode of a challenge-response procedure that includes a registration mode and the authentication mode; identifying screen information, wherein the screen information is generated based on a plurality of internal responses created using a PUF block while in the registration mode; selecting at least one valid internal challenge from among a plurality of initial internal challenges based on the screen information according to the authentication mode; and generating an authentication response to the authentication challenge based on the at least one valid internal challenge using the PUF block.

In some examples, the method further includes receiving a plurality of registration challenges while in the registration mode; generating a plurality of initial internal responses for each of the registration challenges; selecting at least one valid internal response from among the initial internal responses; generating the screen information based on the valid internal responses; and generating a registration response to each of the registration challenges based on the at least one valid internal response.

In some examples, the method further includes generating the initial internal challenges based on the challenge received while in the authentication mode; determining a validity of each of the initial internal challenges is valid based on the screen information, wherein the at least one valid internal challenge is selected based on the validity; and generating at least one internal response based on the at least one valid internal challenge using the PUF block, wherein the authentication response is generated based on the at least one internal response.

Figure 12:
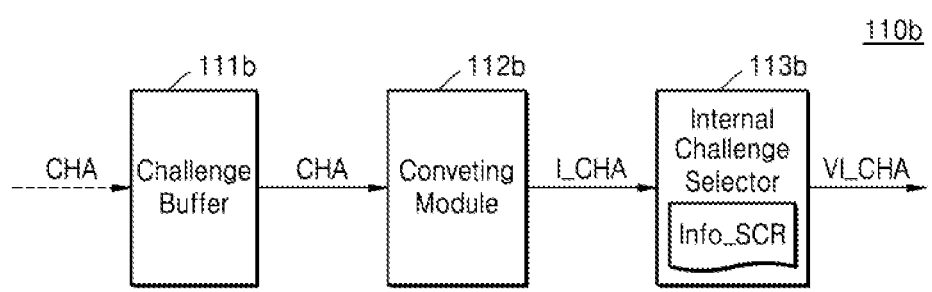
FIG. 12 is a block diagram illustrating an internal challenge generator according to an embodiment.

FIG. 12 is a block diagram illustrating the internal challenge generator 110*b*, according to an embodiment. FIG. 12 illustrates an operation of the internal challenge generator 110*b* in the authentication mode. Duplicate descriptions previously given with reference to FIG. 5 are omitted.

Referring to FIG. 12, the internal challenge generator 110*b* may include a challenge buffer 111*b*, a converting module 112*b*, and an internal challenge selector 113*b*. Because the challenge buffer 111*b* and the converting module 112*b* perform the same or similar operations as the challenge buffer 111*a* and the converting module 112*a* in FIG. 5, respectively, duplicate descriptions thereof are omitted.

In the authentication mode, the challenge buffer 111*b* may store the first challenge CHA received from the outside (for example, the host 20 in FIG. 1), and the converting module 112*b* may read the first challenge CHA from the challenge buffer 111*b*. The converting module 112*b* may sequentially generate a plurality of internal challenges I_CHA from the first challenge CHA using the conversion algorithm.

The internal challenge selector 113*b* may, in the authentication mode, select the valid internal challenges VI_CHA among the plurality of internal challenges I_CHA based on the screen information Info_SCR. In an embodiment, the internal challenge selector 113*b* may be deactivated in the registration mode and then activated after entering the authentication mode.

After entering the authentication mode, the internal challenge selector 113*b* may read the screen information Info_SCR from the screen information buffer (for example, 134*a* in FIG. 6). As described above, the screen information Info_SCR may include information about the valid initial internal response. The information about the valid initial internal response according to the screen information Info_SCR may be equally applied to the internal responses generated in response to the plurality of internal challenges I_CHA because the plurality of internal challenges I_CHA generated in response to the first challenge CHA are identical to the plurality of valid initial internal challenges generated in response to the first challenge CHA in the registration process. In other words, the validity determination according to the screen information Info_SCR may be applied to the internal response as well as the initial internal response. Accordingly, the internal challenge selector 113*b* may select the internal challenge corresponding to the valid initial internal response among the plurality of internal challenges I_CHA as the valid internal challenge VI_CHA.

According to an embodiment of the inventive concept, an invalid internal response among the internal responses output from the PUF block is pre-filtered by determining the valid internal challenge VI_CHA using the screen information Info_SCR in advance. Accordingly, resources used to generate the invalid internal response such as an authentication time and a PUF cell may be saved.

Figure 13:
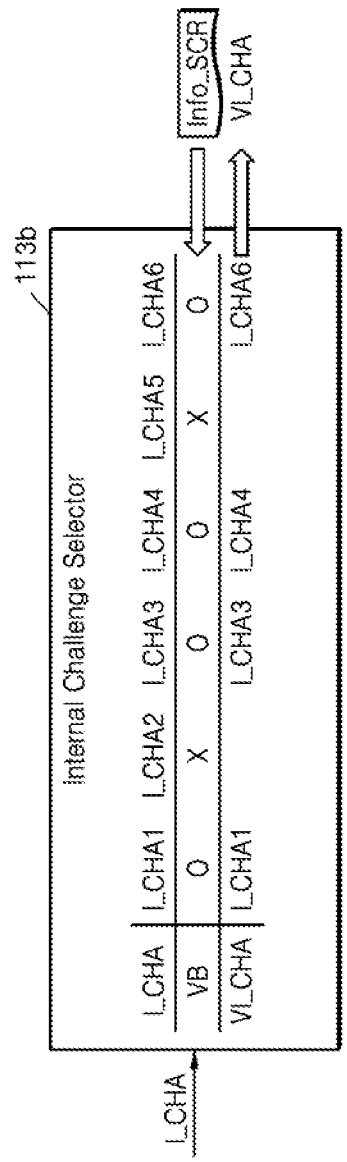
FIG. 13 is a diagram illustrating an operation of an internal challenge selector, according to an embodiment.

FIG. 13 is a diagram illustrating an operation of the internal challenge selector 113*b*, according to an embodiment. Duplicate descriptions previously given with reference to FIG. 12 are omitted.

Referring to FIG. 13, the internal challenge selector 113*b* may receive the plurality of internal challenges I_CHA. In the example of FIG. 13, the plurality of internal challenges I_CHA may include first through sixth internal challenges I_CHA1 through I_CHA6. However, this is just an example, and another number of internal challenges may be used.

The internal challenge selector 113*b* may obtain the validity bit VB from the screen information Info_SCR. For example, the internal challenge selector 113*b* may read the validity bit VB included in the screen information Info_SCR. For example, the internal challenge may obtain the validity bit VB by determining the first value 'O' or the second value 'X' of the validity bit using the valid count CNT V or the invalid count CNT_IV included in the screen information Info_SCR.

The internal challenge selector 113b may select the internal challenge, in which the corresponding validity bit VB is the first value 'O' as the valid internal challenge. In the example of FIG. 13, the validity bits VB corresponding to the first internal challenge I_CHA1, the third internal challenge I_CHA3, the fourth internal challenge I_CHA4, and the sixth internal challenge I_CHA6 have first values 'O', and therefore the internal challenge selector 113b may output the first internal challenge I_CHA1, the third internal challenge I_CHA3, the fourth internal challenge I_CHA4, and the sixth internal challenge I_CHA6 to the PUF block as the valid internal challenges VI_CHA.

Figure 14:
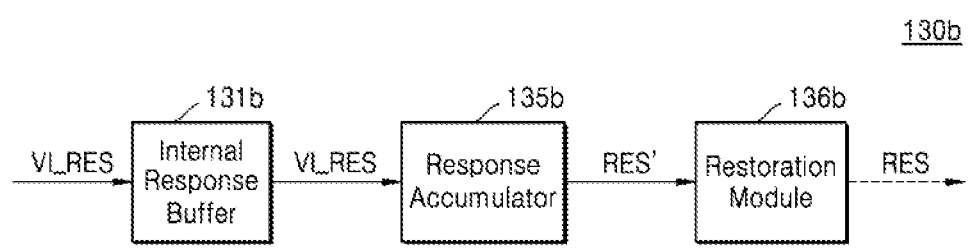
FIG. 14 is a block diagram illustrating a response generator according to an embodiment.

FIG. 14 is a block diagram illustrating the response generator 130b, according to an embodiment. FIG. 14 illustrates an operation of the response generator 130b in the authentication mode. Duplicate descriptions given with reference to FIG. 6 are omitted.

Referring to FIGS. 10 and 14, the response generator 130b may include an internal response buffer 131b, a response accumulator 135b, and a restoration module 136b. In the authentication mode, the internal response buffer 131b may store the valid internal response VI_RES output from the PUF block 120b. The response accumulator 135b may generate a first original response RES' by reading the valid internal response VI_RES from the internal response buffer 131b and sequentially accumulating or concatenating the valid internal response VI_RES. The restoration module 136b may generate the first response RES by applying a restoration algorithm to the first original response RES', and may output the generated first response RES to the outside (for example, the host 20 in FIG. 1).

Figure 15:
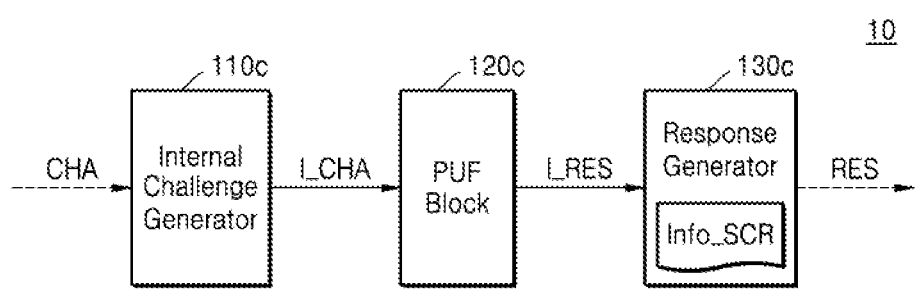
FIG. 15 is a block diagram illustrating an integrated circuit according to an embodiment.

FIG. 15 is a block diagram illustrating the integrated circuit 10 according to an embodiment. FIG. 15 illustrates an operation of the integrated circuit 10 in the authentication mode. Duplicate descriptions previously given with reference to FIG. 10 are omitted.

Referring to FIG. 15, the integrated circuit 10 may include an internal challenge generator 110c, a PUF block 120c, and a response generator 130c. In the authentication mode, the internal challenge generator 110c may receive the first challenge CHA from the outside (for example, the host 20 in FIG. 1). The internal challenge generator 110c may sequentially generate a plurality of internal challenges I_CHA corresponding to the first challenge CHA using a conversion algorithm.

The PUF block 120c may receive the plurality of internal challenges I_CHA, and sequentially generate the plurality of internal responses I_RES corresponding thereto. The response generator 130c may generate the first response RES by selecting the valid internal response among the plurality of internal responses I_RES based on the screen information Info_SCR, and accumulating or concatenating the valid internal responses.

The response generator 130c, according to an embodiment, may select the valid internal response among the plurality of internal responses using the screen information Info_SCR generated in the registration process. Additionally or alternatively, the response generator 130c may generate the first response RES using the valid internal response. According to the present embodiment, various resources may be saved by the response generator 130c selecting the valid internal response using the screen information Info_SCR.

Figure 16:
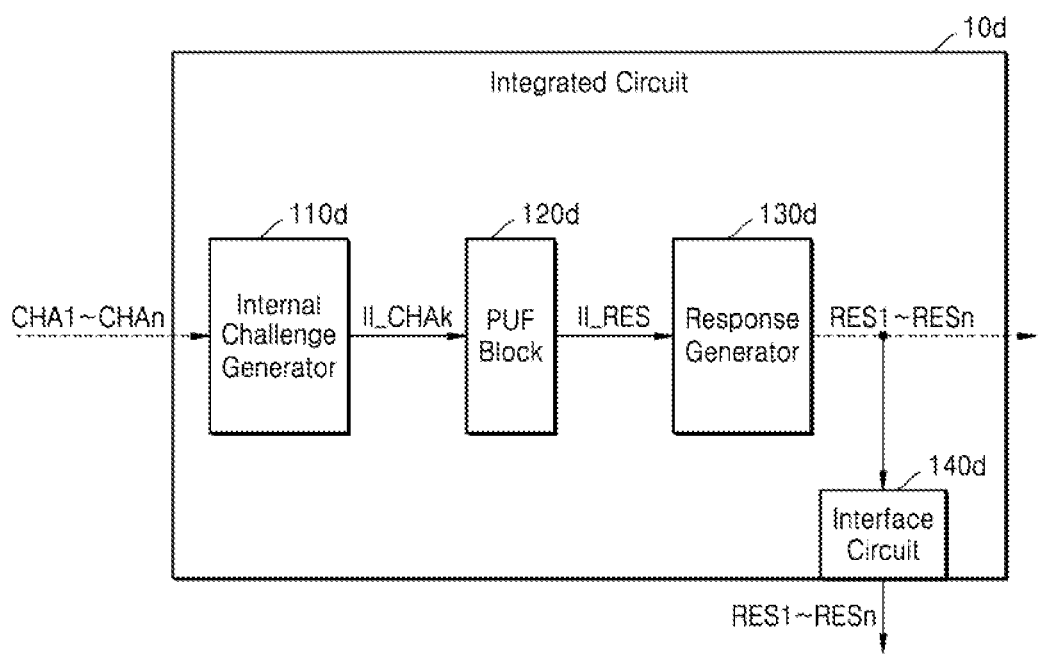
FIG. 16 is a block diagram illustrating an integrated circuit according to an embodiment.

FIG. 16 is a block diagram illustrating an integrated circuit 10d according to an embodiment. FIG. 16 illustrates an example of the integrated circuit 10d including an interface circuit 140d activated in the registration operation. Duplicate descriptions given with reference to FIG. 3 are omitted.

Referring to FIG. 16, the integrated circuit 10d may include an internal challenge generator 110d, a PUF block 120d, and a response generator 130d. Because the internal challenge generator 110d, the PUF block 120d, and the response generator 130d are the same as or similar to the internal challenge generator 110, the PUF block 120, and the response generator 130 in FIG. 3, descriptions thereof are omitted.

The interface circuit 140d may provide the plurality of responses RES1~RESn to the outside of the integrated circuit 10d in the registration operation of the integrated circuit 10d. For example, the interface circuit 140d may receive a plurality of responses RES1~RESn, and output a signal with the plurality of responses RES1~RESn to the outside of the integrated circuit 10d. A host, for example, a manufacturer of the integrated circuit 10d, may collect the plurality of responses RES1~RESn based on the signal provided by the integrated circuit 10d in the registration operation, and may safely store information for authenticating the integrated circuit 10d based on the challenges provided to the integrated circuit 10d and the collected plurality of responses RES1~RESn. Information for authenticating the integrated circuit 10d may be used to authenticate the integrated circuit 10d or a device including the integrated circuit 10d after shipment of the integrated circuit 10d.

The interface circuit 140d may be enabled in the registration operation while being disabled after the registration operation is completed to protect the plurality of responses RES1~RESn from an attack. While the interface circuit 140d, which is enable, normally outputs the signal including the plurality of responses RES1~RESn, the interface circuit 140d, which is disabled, may not be capable of outputting the signal including the plurality of responses RES1~RESn or may be capable of outputting a signal including information unrelated with the plurality of responses RES1~RESn. In an embodiment, the interface circuit 140d may be irreversibly disabled. For example, the interface circuit 140d may include at least one fuse, and the interface circuit 140d may be disabled by at least one fuse being fused after the registration operation is completed.

Figure 17:
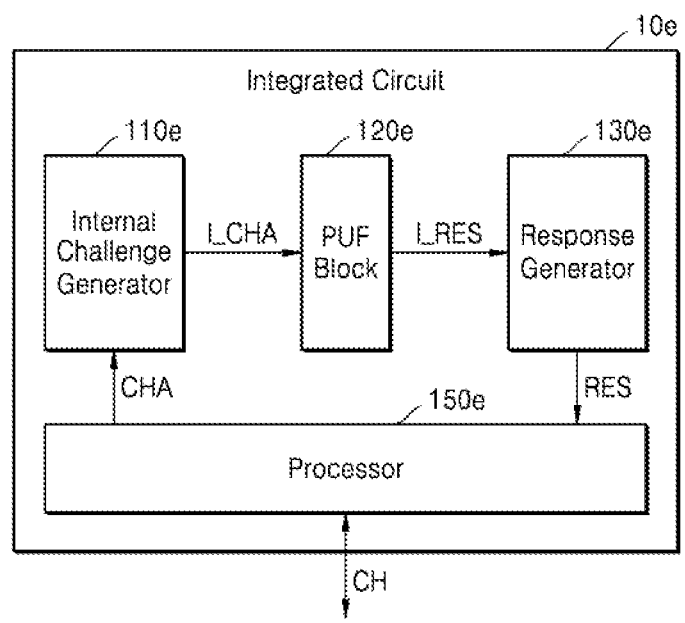
FIG. 17 is a block diagram illustrating an integrated circuit according to an embodiment.

FIG. 17 is a block diagram illustrating an integrated circuit 10e according to an embodiment. Duplicate descriptions previously given with reference to FIGS. 1 through 16 are omitted.

Referring to FIG. 17, the integrated circuit 10e may include a function block that performs other functions as well as a physical copy protection function of a challenge-authentication type. For example, the integrated circuit 10e may, as a system-on-chip (SoC), further include an internal challenge generator 110e, a PUF block 120e, a response generator 130e, and a processor 150e. The processor 150e may include any processing unit that executes a series of instructions and may include a field-programmable gate array (FPGA), a hardware accelerator, or the like. In an embodiment, the processor 150e may output various control signals for controlling the internal challenge generator 110e, the PUF block 120e, and the response generator 130e to the internal challenge generator 110e, the PUF block 120e, and the response generator 130e.

The processor 150e may communicate with another device via a communication channel CH, receive the challenge CHA, or transmit the response RES. The communication channel CH may include a wired channel and/or a wireless channel. For example, the processor 150e may provide the challenge CHA to the internal challenge generator 110e based on the signal received via the communication channel CH, and transfer the response RES provided by the response generator 130e via the communication channel CH.

Figure 18A:
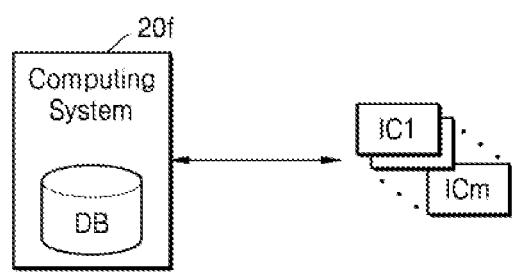
FIGS. 18A and 18B are block diagrams illustrating environments using integrated circuits, according to embodiments.
Figure 18B:
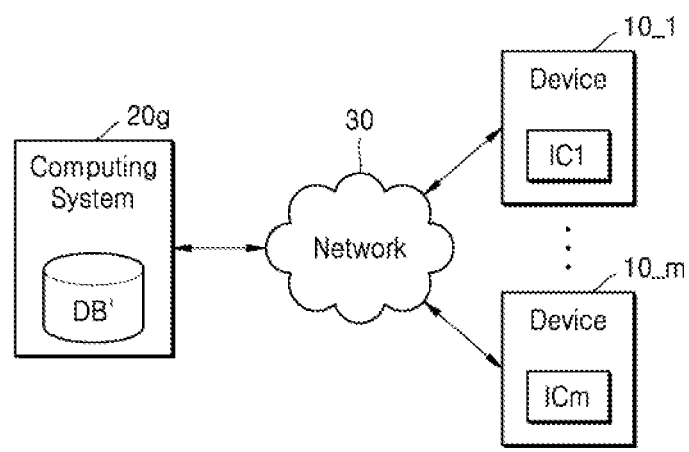

FIGS. 18A and 18B are block diagrams illustrating environments using integrated circuits, according to embodiments. FIG. 18A illustrates an environment in which integrated circuits IC1~ICm (where m is an integer greater than 1) are used in the registration operation. FIG. 18B illustrates an environment in which the integrated circuits IC1~ICm are used in the authentication operation.

Referring to FIG. 18A, a computing system 20f operated by a host, for example, a manufacturer of the integrated circuits IC1~ICm, may communicate with each of the integrated circuits IC1~ICm. For example, the computing system 20f may provide a plurality of challenges to a first integrated circuit IC1 and obtain a plurality of responses respectively corresponding to the plurality of challenges from the first integrated circuit IC1. The computing system 20f may include a database DB with the plurality of challenges and the plurality of responses provided to the first integrated circuit IC1. For example, the database DB may store the challenge-response pairs. In an embodiment, each of the integrated circuits IC1~ICm may operate in the registration mode according to the method described above with reference to FIGS. 1 through 16. In an embodiment, each of the integrated circuits IC1~ICm may generate the screen information Info_SCR including information about the valid internal response.

Referring to FIG. 18B, a computing system 20g operated by a host, for example, a manufacturer of the integrated circuits IC1~ICm or a manufacturer of devices 10_1~10_m each including the integrated circuits IC1~ICm as an authenticated user of the integrated circuits IC1~ICm, may communicate with the devices 10_1~10_m via a network 30. The network 30 may include any network, and as a non-limiting example, a cellular network, a local area network (LAN), a wireless local area network (WLAN), or the like. Additionally or alternatively, the computing system 20g and the devices 10_1~10_m may communicate with each other via wired and/or wireless communication.

The computing system 20g may include a database DB', and the database DB' may be the same as the database DB in FIG. 18A, or may include data generated based on the database DB in FIG. 18A. The computing system 20g may authenticate devices 10_1~10_m based on the database DB'. For example, the computing system 20g may generate the challenge based on the database DB', and provide the challenge to a first device 10_1 via the network 30. The computing system 20g may receive a response generated by the first integrated circuit IC1 included in the first device 10_1 based on the challenge via the network 30, and by evaluating the response based on the database DB', may authenticate the first device 10_1. In an embodiment, each of the integrated circuits IC1~ICm may operate in the authentication mode according to the method described above with reference to FIGS. 1 through 16. In an embodiment, each of the integrated circuits IC1~ICm may select a valid internal challenge using screen information, and generate a response using the selected internal challenge.

While the inventive concept has been particularly shown and described with reference to embodiments thereof, it will be understood that various changes in form and details may be made therein without departing from the spirit and scope of the following claims.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. An integrated circuit configured to perform authentication using a challenge-response method, the integrated circuit comprising:
   an internal challenge generator configured to, in an authentication mode, receive a challenge, generate a plurality of internal challenges corresponding to the challenge, and select a plurality of valid internal challenge among the plurality of internal challenges using screen information;
   a physically unclonable function (PUF) block configured to generate a plurality of valid internal responses respectively changing according to the plurality of valid internal challenges; and
   a response generator configured to output a response generated using the plurality of valid internal responses.

2. The integrated circuit of claim 1, wherein the internal challenge generator sequentially generates a plurality of initial internal challenges corresponding to each of a plurality of challenges in a registration mode,
   the PUF block sequentially generates a plurality of initial internal responses respectively according to the plurality of initial internal challenges, and
   wherein the response generator is further configured to select at least one valid initial internal response, wherein the at least one valid internal response is usable among the plurality of initial internal responses and to generate the screen information based on the selected at least one valid initial internal response.

3. The integrated circuit of claim 2, wherein the response generator calculates a Hamming weight of each of the plurality of initial internal responses and selects the at least one valid initial internal response based on the Hamming weight.

4. The integrated circuit of claim 3, wherein, when, with respect to an initial internal response of n-bits, the Hamming weight is less than a first reference value less than n/2 (where n is an integer) or greater than a second reference value greater than n/2, the response generator determines the initial internal response as valid, and
   when the Hamming weight is equal to or greater than the first reference value and equal to or less than the second reference value, the response generator determines the initial internal response as invalid.

5. The integrated circuit of claim 4, wherein, when determining the initial internal response as valid, the response generator generates a first value as a valid bit corresponding to the initial internal response, and when determining the initial internal response as invalid, the response generator generates a second value different from the first value as the valid bit, and the screen information comprises the valid bit.

6. The integrated circuit of claim 3, wherein the response generator comprises a counter, the counter generates a valid count by counting invalid initial internal responses among the plurality of initial internal responses based on the Hamming weight, and the screen information comprises the valid count.

7. The integrated circuit of claim 3, wherein the response generator comprises a counter, the counter generates an invalid count by counting valid initial internal responses among the plurality of initial internal responses based on the Hamming weight, and the screen information comprises the invalid count.

8. The integrated circuit of claim 2, wherein the internal challenge generator, in the registration mode, sequentially generates a plurality of initial internal challenges corresponding to each of the plurality of challenges using a conversion algorithm, and in the authentication mode, receives a first challenge among the plurality of challenges, sequentially generates a plurality of first internal challenges by applying the conversion algorithm to the first challenge, and selects a plurality of first valid internal challenges among the plurality of first internal challenges using the screen information.

9. The integrated circuit of claim 8, wherein the PUF block is configured to sequentially generate a plurality of first valid internal responses respectively corresponding to the plurality of first valid internal challenges, and the response generator is configured to generate a first original response by accumulating or concatenating the plurality of first valid internal responses.

10. The integrated circuit of claim 9, wherein the response generator is configured to restore the first original response to a first response corresponding to the first challenge using the conversion algorithm.

11. The integrated circuit of claim 10, wherein the conversion algorithm comprises any one of a decryption algorithm, a hash algorithm, and a scramble algorithm, and the decryption algorithm comprises any one of a decoding algorithm, a hash algorithm, and a descramble algorithm.

12. An integrated circuit configured to perform authentication using a challenge-response method, the integrated circuit comprising:

an internal challenge generator configured to, in a registration mode, receive a plurality of challenges, and sequentially generate a plurality of initial internal challenges corresponding to each of the plurality of challenges;

a physically unclonable function (PUF) block configured to generate a plurality of initial internal responses respectively changing according to the plurality of initial internal challenges; and a response generator configured to select at least one valid initial internal response that is usable among the plurality of initial internal responses, and generate screen information based on the selected at least one valid initial internal response.

13. The integrated circuit of claim 12, wherein the response generator calculates a Hamming weight of each of the plurality of initial internal responses and selects the at least one valid initial internal response based on the Hamming weight.

14. The integrated circuit of claim 13, wherein, when the Hamming weight is less than a first reference value less than n/2 (n is an integer) or greater than a second reference value greater than n/2 with respect to an initial internal response of n-bits, the response generator determines the initial internal response as valid, and when the Hamming weight is equal to or greater than the first reference value and equal to or less than the second reference value, determines the initial internal response as invalid.

15. The integrated circuit of claim 14, wherein the response generator is configured to generate a first value as a valid bit corresponding to the initial internal response when determining the initial internal response as valid, and to generate a second value different from the first value as the valid bit when determining the initial internal response as invalid, and the screen information comprises the valid bit.

16. The integrated circuit of claim 13, wherein the response generator comprises a counter, the counter is configured to generate a valid count by counting an invalid initial internal response among the plurality of initial internal responses based on the Hamming weight, and the screen information comprises the valid count.

17. The integrated circuit of claim 13, wherein the response generator comprises a counter, the counter is configured to generate an invalid count by counting a valid initial internal response among the plurality of initial internal responses based on the Hamming weight, and the screen information comprises the invalid count.

18. A method of authenticating an integrated circuit, the method comprising:

receiving an authentication challenge while in an authentication mode of a challenge-response procedure that includes a registration mode and the authentication mode;

identifying screen information, wherein the screen information is generated based on a plurality of internal responses created using a physically unclonable function (PUF) block while in the registration mode;

selecting at least one valid internal challenge from among a plurality of initial internal challenges based on the screen information according to the authentication mode; and generating an authentication response to the authentication challenge based on the at least one valid internal challenge using the PUF block.

19. The method of claim 18, the method comprising:

receiving a plurality of registration challenges while in the registration mode;

generating a plurality of initial internal responses for each of the registration challenges;

selecting at least one valid internal response from among the initial internal responses;

generating the screen information based on the at least one valid internal response; and generating a registration response to each of the registration challenges based on the at least one valid internal response.

20. The method of claim 18, further comprising:

generating the initial internal challenges based on the challenge received while in the authentication mode;

determining a validity of each of the initial internal challenges is valid based on the screen information, wherein the at least one valid internal challenge is selected based on the validity; and generating at least one internal response based on the at least one valid internal challenge using the PUF block, wherein the authentication response is generated based on the at least one internal response.

* * * * *